United States Patent [19]

Verbanac

[11] 4,052,226

[45] Oct. 4, 1977

[54] DIRECTED ENZYMOLYSIS OF STARCH

[75] Inventor: Frank Verbanac, Decatur, Ill.

[73] Assignee: A. E. Staley Manufacturing Company, Decatur, Ill.

[21] Appl. No.: 616,785

[22] Filed: Sept. 25, 1975

[51] Int. Cl.$^2$ .................. C12D 13/02; C13F 3/00; C13L 3/00

[52] U.S. Cl. .................................. 127/29; 195/12; 195/30; 195/31 R

[58] Field of Search ............... 195/7, 11, 31 R, 30, 195/12; 260/233.3 R, 233.5; 127/29; 536/48, 49, 45

[56] References Cited

U.S. PATENT DOCUMENTS

| | | | |
|---|---|---|---|
| 3,505,110 | 4/1970 | Kesler et al. | 195/31 R |
| 3,525,672 | 8/1970 | Wurzburg et al. | 195/31 R |
| 3,557,091 | 1/1971 | Martin et al. | 260/233.5 |
| 3,689,361 | 9/1972 | Speakman et al. | 195/31 R |
| 3,804,716 | 4/1974 | Langlois | 195/31 R |
| 3,849,194 | 11/1974 | Armbruster et al. | 195/31 R |
| 3,922,198 | 11/1975 | Kuske et al. | 195/31 R |

FOREIGN PATENT DOCUMENTS

| | | | |
|---|---|---|---|
| 1,171,893 | 11/1969 | United Kingdom | 260/233.5 |

*Primary Examiner*—Alvin E. Tanenholtz
*Assistant Examiner*—Thomas G. Wiseman
*Attorney, Agent, or Firm*—M. Paul Hendrickson; Charles J. Meyerson

[57] ABSTRACT

Starch hydrolyzates having a desired degree of polymerization are prepared by hydrolyzing derivatized starch esters with amylase and thereafter saponifying the starch ester hydrolyzates to obtain a hydrolyzate product essentially free from substitution. Amylolysis and saccharide distribution of the resultant saponified hydrolyzates are effectively accomplished by preselecting a starch ester having the appropriate degree of ester substitution.

14 Claims, No Drawings

DIRECTED ENZYMOLYSIS OF STARCH

BACKGROUND OF THE INVENTION

Starch hydrolyzates are conventionally prepared by hydrolyzing starch substrates with amylase. Initially, the food industry's primary interest resided in high F.E. conversion syrups which could serve as a low cost sweetener. Within the last decade or so, low D.E. starch hydrolyzates have become increasingly attractive for certain food applications, especially when non-sweet, non-hygroscopic, bland, bodying or bulking characteristics are desired.

The proportion of fermentable extracts (i.e., F.E.) and high molecular weight saccharides in a given starch hydrolyzate will primarily depend upon the particular type of amylase employed in its preparation and the extent of starch hydrolysis. In producing starch hydrolyzates, the D.E. values are frequently used to characterize the composition and functional properties of the hydrolyzate. Since the enzymatic hydrolysis of starches generally follows substantially the same pattern or mode of hydrolysis, a hydrolyzate manufacturer cannot substantially alter or control the saccharide distribution in low D.E. starch hydrolyzates simply by altering its D.E. value.

If the starch hydrolyzate manufacturer were able to substantially alter and control the saccharide distribution, starch hydrolyzates could be more suitably made and adapted for specific end-uses. This would significantly improve upon the functionality and adaptability of low D.E. starch hydrolyzates in a broader spectrum of food products.

Heretofore the art has been relatively unsuccessful in its attempts to control or alter the saccharide distribution of starch hydrolyzates. Alpha-amylases are conventionally used to produce low D.E. starch hydrolyzates such as maltodextrins. In preparing low D.E. starch hydrolyzates from underivatized starches, the art has been confronted with the dilemma of either providing an excessive amount of fermentable sugars or an excessive amount of high molecular polysaccharides, or both, with little, if any, control over the production of saccharides having a D.P. of 30 or higher. If the alpha-amylase hydrolysis reaction is allowed to proceed towards completion, the resultant starch hydrolyzate will have a high D.E. and a high proportion of fermentable sugars and a low amount of $D.P._{30+}$ saccharide. Conversely, if the starch hydrolysis is continued for a relatively short period of time, the resultant hydrolyzate will be characterized as containing a negligible amount of fermentable sugars and a large proportion of insufficiently hydrolyzed polysaccharides. These insufficiently hydrolyzed saccharides are generally undesirable because of their difficulty to disperse in aqueous systems and susceptibility to retrogradation. Control of the saccharide distribution, especially above $D.P._{10+}$ would enable the art to tailor-make and adapt starch hydrolyzates to a broader spectrum of food products.

Starch derivatives are recognized as yielding different hydrolyzate products from those which are obtained from underivatized starches. In British Patent Specification No. 1,171,893, cold-water-soluble, low-viscosity, gum-like starch products are prepared by hydrolyzing derivatized amylopectin starches with amylases. Similarly, U.S. Pat. No. 3,505,110 discloses a process for preparing sugar ethers by saccharifying liquefied hydroxypropylated starches with starch saccharifying enzymes. The sugar ethers of U.S. Pat. No. 3,505,110 are reportedly non-caloric and essentially non-degradable by salivary amylases. Derivatized starch hydrolyzates characterized as possessing improved freeze-thaw stability properties are disclosed in U.S. Pat. No. 3,525,672. These derivatized starch hydrolyzates are reportedly prepared by hydrolyzing inhibited amylopectin starch granules with exo-amylases. Another process for preparing derivatized starch conversion products from cross-linked and inhibited starch granules has been disclosed in U.S. Pat. No. 3,804,716.

In the paper and textile industry, the hydrolysis of starch derivatives with alpha-amylase has been reported. For purposes of improving the paper coating character of starch hydrolyzates, granular cyanoethyl starches of a low degree of substitution (d.s.) are hydrolyzed with alpha-amylase in U.S. Pat. No. 3,689,361. To improve upon the liquefaction efficacy of alpha-amylase during paper sizing and warp sizing operations, acetylated granular starches (prepared in the presence of ferrous salts and hydrogen peroxide) have been disclosed in U.S. Pat. No. 3,557,091.

DISCLOSURE OF THE INVENTION

According to the present invention, there is provided a method for regulating the saccharide distribution of starch hydrolyzates prepared by the amylolysis of starches, said method comprising the steps of:

a. hydrolyzing a saponifiable and derivatized starch ester with an amylase to a starch ester hydrolyzate;

b. saponifying the starch ester groups of the starch ester hydrolyzate to the hydroxyl form and thereby provide a saccharide product essentially free from ester groups; and c. recovering the resultant saccharide product.

Pursuant to this method, it is now possible to obtain different saccharide products comparative to those presently derived via the hydrolysis of underivatized starches. In the present invention, the saponifiable ester groups provide an effective means for controlling the hydrolysis reaction and hydrolyzate saccharide distribution. The starch ester groups inhibit the ability of the amylase to hydrolyze 1,4 starch linkages and especially those linkages which are in close proximity of the ester moiety. In most instances, there is no amylolysis of 1,4 glucosidic linkages juxtapositional to the ester group. Those 1,4 glucosidic linkages further removed, however, are generally susceptible to enzymatic hydrolysis. The extent to which amylase can effectively hydrolyze a starch ester is directly related to its ester degree of substitution (i.e., D.S.). As the starch ester D.S. increases, the ability of the amylase to hydrolyze the 1,4 glucosidic linkages will correspondingly decrease. Accordingly, the saccharide distribution of the resultant hydrolyzate can be effectively controlled and predetermined by selection of the appropriate starch ester D.S. for the amylolysis reaction. Upon achieving the desired saccharide distribution, the starch ester hydrolyzate is then converted to the non-ester form by saponificaton.

Suitable starch ester substrates employable in this invention include any derivatized ester bearing starch which is susceptible to amylase hydrolysis and conversion to the underivatized saccharide form by substituting the ester with hydroxyl group. The starch esters and the method of their preparation are well known (e.g., see *Starch Chemistry and Technology* by Whistler et al. (1965) Vol. 1, pages 443–460; Vol. II, pages 297–312 and 354–399 which is incorporated herewith by reference).

Acetylated starches (particularly starch acetates) are especially useful as a starch ester source material. The starch ester groups may be contiguously attached to a single starch molecule (frequently referred to as monofunctional ester groups). Similarly, saponifiable crosslinked starch esters such as inhibited starches prepared by reacting starches with polyfunctional ester forming reactants such as divinyldicarboxylic acid esters (e.g., divinylsuccinate), dibasic aromatic acid chlorides (e.g., terephthalic acid chloride), dibasic acids and acetic anhydride (e.g., adipic acid and acetic anhydride), anhydrides of dibasic acids and acetic anhydride (e.g., succinic anhydride and acetic anhydride), carbonate esters (e.g., phosgene), mixed anhydrides of dibasic acids, mixtures thereof and the like, may be used as starch esters.

The starch esters may be derived from any suitable starch source such as corn, wheat, potato, tapioca, rice, sago, waxy maize, etc. The amylose content of the starch esters may broadly range from starches essentially free from amylose (e.g., waxy maize) to high amylose granular starch or relatively pure amylose fractions. Granular, soluble (e.g., pregelled), or partially soluble starch ester substrates, may be employed as a starch ester source.

The degree of ester substitution will have a pronounced effect upon the character and saccharide distribution of the starch ester hydrolyzates. Starch esters having a high degree of ester substitution are suitably adapted to provide a higher proportion of starch ester hydrolyzates with a degree of polymerization in excess of 30 than those derivatized to a lesser degree. Irrespective of the particular type of starch ester employed, the esterified starch product should possess a sufficient number of ester groups to have a detectable effect upon the saccharide distribution of the resultant hydrolyzate (comparative to an underivatized starch substrate). The starch ester D.S. can vary considerably over a broad range, starches having a degree of substitution from about 0.01 to less than about 1.0 ester groups per anhydroglucose units may be employed herein. At the lower ester D.S. levels, it is more difficult to control the hydrolyzate reaction. The starch ester, however, should not be derivatized to such an extent that the amylase is incapable of hydrolyzing the starch. Within the intermediate starch ester range (D.S. of about 0.05 to about 0.5), the hydrolysis reaction becomes much more easily controllable and reproducible comparative to those conducted upon starches of a higher or lesser degree of ester substitution. Starch esters having a D.S. between about 0.1 to about 0.3 with alpha-amylase hydrolysis have been found particularly useful in practicing the present invention.

Any enzyme or enzyme combination capable of hydrolyzing glucosidic linkages (such as those present in amylose, amylopectin, dextrin or starch hydrolyzate) may be used to hydrolyze the starch ester. Illustrative enzymes suitably adapted to hydrolyze starch glucosidic linkages include alpha-amylase (endohydrolysis of 1,4-alpha-glucosidic linkages in polysaccharides containing three or more 1,4-alpha-linked D-glucose units), exo-1,4-alpha-glucosidase (frequently referred to as glucoamylase which hydrolyzes terminal 1,4-linked alpha-D-glucose residues from the non-reducing ends of the chains with release of glucose), beta-amylase (hydrolyzes 1,4-alpha-glucosidic linkages in polysaccharide so as to remove successive maltose units from the non-reducing ends of the chains). Other illustrative enzymes include dextranase or oligo-1,6-glucosidase (endohydrolysis of 1,6-alpha-glucosidase in isomaltose and dextrins), alpha-glucosidase, pullulanase (frequently referred to as R-enzyme, limit dextranase or debranching enzyme via endohydrolysis of 1,6-alpha-glucosidic linkages of alpha-amylase or beta-amylase dextrins of amylopectin) and the like. The enzymatic hydrolysis may be conducted with a specific amylase, or concurrently, or in sequential steps with two or more enzymes possessing a different pattern or mode of enzymatic hydrolysis.

The amylolysis of the starch esters with exo-amylases (such as beta-amylase and exo-1,4-alpha-glucosidase) will proceed in the conventional manner by the hydrolysis of 1,4-linked alpha-D-glucose residues from the non-reducing ends of the chains until the enzyme encounters an interferring ester moiety. This terminates or prevents further enzymatic hydrolysis at that particular portion of the starch molecule. Similarly, endoamylases, such as alpha-amylase, may be used to randomly hydrolyze those glucosidic linkages which are available and not influenced by the ester moieties. Thus, the starch esters effectively function as a means for controlling and regulating the degree of hydrolysis and endoamylases and exo-amylases. Pullulanase may be employed to hydrolyze 1,6-glucosidic linkages in combination with the 1,4glucosidic hydrolyzing enzymes with the former enzyme providing additional hydrolyzable sites for the latter enzymes.

It is conventional to initially paste an underivatized starch slurry at elevated temperatures and superatmospheric pressures (e.g., jet cook at 250° °F.), and hydrolyze the pasted starch to the desired degree of conversion with the appropriate amylase preparations. The low D.E. starch hydrolyzates are prepared by hyddrolyzing the starch paste with alpha amylase. High F.E. conversion syrups are usually initially liquefied with an acid or alpha-amylase to a D.E. of about 20 or less and then saccharified with an exo-amylase. Starch pasting and alpha-amylase liquefaction at elevated temperatures have been disclosed in U.S. Pat. Nos. 3,783,100; 3,378,462; and 3,551,923. If desired, these conventional pasting, liquefaction and saccharification techniques may be used in preparing the hydrolyzate products of this invention. However, it is possible pursuant to the present method to prepare saponifiable monoester hydrolyzates by directly hydrolyzing the soluble, monoester starch substrates in a single stage. For example, the soluble monoesters may be directly saccharified with the appropriate amylase system to the desired end product without necessitating the conventional prethinning or starch liquefaction processing steps.

Underivatized starch molecules are prone to retrograde and form insoluble starch particles at high starch paste solids level (e.g., 25–35% d.s.b. range). Retrograded starch particles cannot be effectively hydrolyzed by amylases. In general, the commercially available starch esters are sufficiently derivatived so that the unhydrolyzed and hydrolyzed monoesters remain in solution without retrograding at the more elevated solids level (e.g., about 40% to about 55%). Although the invention is suitably adapted to convert starches at a low solids level (e.g., about 20–35%), the starch esters permit the hydrolysis to be conducted in excess of the 55% starch solids level.

Conventional starch enzyme hydrolysis conditions may be suitably used to convert the starch monoesters into the desired hydrolyzate product. Thus, the optimal temperature, conversion time, amylase requirements, pH and other hydrolysis conditions as presently employed in the hydrolysis of non-derivatized starches may be used to hydrolyze the starch esters. Starch monoester hydrolyzates with D.E. values commensurate with those obtained by conventional (e.g., D.E. about 1–95) can be prepared via the present method. The method may be adapted to continuous or semicontinuous or batch type operations.

Because the degree of hydrolysis is primarily controlled by the degree of ester substitution, the starch hydrolyzate manufacturer need not be concerned about excessive hydrolysis thereof. Unlike conventional starch hydrolysis reactions, which necessitate termination of enzymatic hydrolysis upon achievement of the desired D.E., the hydrolysis medium herein can be continually or incrementally charged or replenished with additional starch ester to compensate for its depletion during the hydrolysis reaction. Since the hydrolyzate products are soluble, the hydrolyzate solids may be permitted to become highly concentrated without concomitant development of insoluble hydrolyzates. By conducting the hydrolysis in this manner, substantial enzyme savings as well as more effective usage of the total hydrolysis capacity of the amylase can be realized by the starch hydrolyzate manufacturer. Without necessitating costly processing or equipment modifications, conventional batch-type hydrolysis reactions may thus be operated as continuous or semi-continuous processes.

Upon achieving the desired ester hydrolyzate, the hydrolyzate is then converted into a saccharide product which is essentially free from ester substituents. The term saponification herein broadly refers to any means whereby the hydrolyzate esters are converted into a saccharide product which is essentially free from ester substituents. This conversion step may be achieved by enzymatic treatment (e.g., phosphatase, carboxylesterase, glucosulphatase, glucose-6-phosphatase, glucose-1-phosphatase, etc.) or by chemical means.

The conversion of the ester hydrolyzate to the unsubstituted saccharide form is most suitably achieved by reacting it with a strong base under conventional saponification techniques. Illustrative strong base reactants include the strong metal base hydroxides such as the alkaline earth and alkali metal hydroxides and precursors thereof (e.g., sodium, potassium and calcium hydroxides, the calcium oxides, etc.), mixtures thereof and the like. The conversion of the starch ester moieties to the acid salt form and concomitant of saccharide product is most suitably conducted at a pH and temperature for a period of time sufficient to replace essentially all of the ester moieties. The saponification is preferably conducted at an alkaline pH between about 9.0 to about 12.0 (preferably at about pH 10.5) in the presence of at least a stoichiometric amount of strong metal base. In the saponification reaction, the achievement of a constant alkaline pH is generally indicative that substantially all the ester moieties have been chemically removed from the hydrolyzate saccharide molecules.

The saponified hydrolyzate products of this invention differ from those obtained by the conventional enzymatic hydrolysis of underivatized starch substrates. For any given D.E. value, conventional enzymatic hydrolysis cannot substantially alter the saccharide distribution of the hydrolyzate. The present method substantially alters the composition and saccharide distribution of the hydrolyzate products. The chain length of the hydrolyzates herein are controlled to the desired degree of conversion by the degree of ester substitution.

Irrespective of the particular amylase or amylase combination employed in hydrolyzing the starch esters, the starch hydrolyzates prepared by the present process will contain a greater percentage of the high molecular weight saccharides comparative to those obtained from underivatized starch substrates. Depending upon the starch ester d.s., hydrolyzates having the degree of polymerization (i.e., D.P.) of 30 or more in an amount of at least 25% by weight, and, if desired, greater than 35% or more than 50% by weight (based on the total starch ester hydrolyzate weight) can easily be prepared via amylolysis of the starch esters herein. Unlike conventional underivatized starch hydrolyzates which normally contain these higher polysaccharides over a broad D.P. distribution curve, the distribution curve for the high molecular weight esterified hydrolyzate herein can be controlled within a narrow saccharide distribution range.

Upon saponification, the high-molecular-weight, unbranched starch hydrolyzates become water-insoluble while the lower molecular weight and branched saccharide saponification products remain water-soluble. By partitioning the water-insolubles from the water-solubles, hydrolyzate products containing a higher percentage intermediate saccharides can be obtained by the present process. Under conventional enzymatic hydrolysis, the intermediate water-soluble saccharide products are not normally produced because the unbranched, high molecular weight saccharides at elevated concentrations will typically retrograde into insoluble particles, which prevents its hydrolysis with the amylase. In conventional enzymatic hydrolysis, the lower molecular weight saccharide products are produced in substantial amounts as the hydrolyzate D.E. increases and they function as a diluent to inhibit the insolubles from retrograding therein. Herein the hydrolysis reaction proceeds atypically with the starch ester moieties preventing the hydrolysis of the starch molecule into the anticipated low molecular weight product while the ester groups impart the desired solubility to the hydrolyzate product. Upon saponification of the ester moieties, the higher molecular weight saccharide will become insoluble and precipitate in situ.

For certain applications, the saccharide and the saponified acid salt reaction product may be a desirable end product. For example, the propionates or acetates of sodium, potassium and calcium are sometimes employed in industrial, feed and food applications as bactericides or sequestrants. These salts may be recovered together with the saccharide product and directly used in this form. Most generally, however, it is desirable to partition the acid salt reaction product therefrom and recover the saccharide in a substantially pure form. If the resultant saccharide reaction product contains a relatively large amount of fermentable sugars (especially dextrose), concentration is particularly advantageous to neutralize the saccharide product to a more stable pH (e.g., 4.5 to 6.0). These neutralized products are generally more stable (e.g., under alkaline conditions dextrose reacts to form undesirable color bodies). The purified or unpurified products of this invention may be refined (e.g., subjected to ion exchange treatment), and/or concentrated and/or dried by conventional processing techniques.

The water-insoluble saccharides can be readily partitioned from the saponification media by conventional means. If desired, a starch ester having a high degree of ester substitution and specifically adapted to provide an insoluble hydrolyzate product containing at least 75% or more than 90% insolubles may be suitably adapted to this invention. When it is desired to selectively remove saccharides having a D.P. of 30 or higher from the resultant saponified hydrolyzate product, chemical reagents which preferentially permit these saccharides to become insoluble therein, may be used as partitioning aides. Cooling and concentrating of the saponification product may be appropriately used to accelerate the precipitation and fractionation of the water-insoluble saccharides therefrom. Crystalline, linear starch hydrolyzates can be conveniently made by the present process by ester derivatization of a high amylose starch, hydrolysis thereof with alpha amylase followed by saponification.

The following examples are illustrative of the invention.

EXAMPLE 1

A granular waxy maize starch acetate with a 0.12 acetate degree of substitution (i.e., 3.05 weight percent acetyl on d.s.b.) and a granular waxy maize starch acetate derivative with an acetate degree of substitution of 0.30 (i.e., 7.4 weight percent acetyl on d.s.b.) were prepared by reacting granular waxy maize starch and vinyl acetate in the presence of sodium carbonate as a catalyst (e.g., Starch Chemistry & Technology, Vol. II, Whistler et al. © Academic Press, Inc., Pages 383-384).

The two starch acetate derivatives and an underivatized (i.e., unmodified) granular waxy maize starch (as a control) were then separately hydrolyzed with $\alpha$-amylase. Initially each of the starch substrates which consisted of a slurry (at 23° C.) of 15 parts by weight starch (d.s.b. and corrected for water and acetyl content), 70 parts by weight water, 4 millimoles of sodium succinate pH 5.8 buffer, 0.4 millimoles sodium chloride and 0.3 millimoles calcium chloride was placed into solution by partial hydrolysis with 0.45 units[1] bacterial $\alpha$-amylase[2]/gram of starch (d.s.b.). Upon $\alpha$-amylase addition, each slurry was immediately placed in an 85° C. water bath and hydrolyzed for 20 minutes. The hydrolysis reaction was terminated (i.e., $\alpha$-amylase activity destroyed) by immersing the $\alpha$-amylase solubilized hydrolyzate in a boiling water bath for 15 minutes and cooled to 37° C. The saccharide distribution for each of the $\alpha$-amylase solubilized hydrolyzates was determined by liquid chromatography. Tables 1 and 2 tabulate the respective saccharide distribution for each of the unmodified, 0.12 D.S. acetate and 0.30 D.S. acetate $\alpha$-amylase solubilized hydrolyzates.

[1] — See col. 8, line 63–col. 9, line 9 of U.S. Pat. No. 3,783,100 by R. L. Larson et al.
[2] — Ban 120 (Nova Industri).

Table 1 also tabulates the saccharide distribution of test samples which were subjected to further $\alpha$-amylase hydrolysis employing the solubilized hydrolyzates mentioned above as the starch substrate. In each test, the above starch substrates were diluted with deionized water to 100 milliliter volume and hydrolyzed with 0.167 units $\alpha$-amylase per gram of starch (d.s.b.) for 60 hours at 37° C.

As evident by comparing the saccharide distribution of the $\alpha$-amylase solubilized plus $\alpha$-amylase substrates, the unmodified waxy maize starch hydrolyzates were hydrolyzed to a much greater extent than either the 0.12 D.S. or 0.30 D.S. starch acetate hydrolyzates. Both the 0.12 and 0.30 starch acetates yielded a hydrolyzate product wherein at least ⅜ by weight of the saccharides had a D.P. greater than 30 (e.g., the principal saccharides). The influence of a higher degree of ester substitution upon the greater than D.P. 30 saccharides is evident by a comparison between the unmodified, 0.12 acetate D.S. and 0.30 D.S. acetate saccharide distribution results. By selecting the appropriate level of ester derivatization, the level of saccharides with a D.P. greater than 30 can be effectively controlled. Starch acetates which upon hydrolysis with an $\alpha$-amylase yield saccharides having a D.P. greater than 30, as a major hydrolyzate product, and less than 15% D.P. 11-30 saccharides can be readily prepared. Higher acetate derivatization will typically result in more than 60% D.P. 30+ saccharides and less than 10% D.P. 11-30 saccharides.

Table 2 reports the saccharide distribution in which the $\alpha$-amylase solubilized hydrolyzates (i.e., granular waxy maize samples hydrolyzed at 85° C for 20 minutes with $\alpha$-amylase as described above) were further hydrolyzed with either glucoamylase or $\beta$-amylase. The hydrolyzate products reported in Table 2 under the heading $\alpha$-amylase solubilized plus glucoamylase were obtained by saccharifying the $\alpha$-amylase solubilized starch samples with 132 international glucoamylase units at 37° C. for 60 hours. The results reported in Table 2 under the heading $\alpha$-amylase solubilized plus $\beta$-amylase were obtained by saccharifying the $\alpha$-amylase solubilized hydrolyzate with 35 units of malt $\beta$-amylase for 60 hours at 37° C.

Although not shown by this example, further hydrolysis of the D.S. 0.12 and 0.30 acetate starches with either glucoamylase or $\beta$-amylase beyond the 60 hour saccharification or hydrolysis period will not appreciably alter the saccharide distribution of these samples. Thus the starch acetate D.S. effectively controls the degree of hydrolysis beyond which no further hydrolysis will occur. As the starch ester D.S. increases, the D.P. 30+ saccharide yields will proportionally increase as illustrated in Tables 1 and 2.

The above-mentioned ester hydrolyzates are converted to the unsubstituted saccharide form (i.e., saponified) by adjusting the test sample hydrolyzate of pH 4.7 to a pH 9.3 with 2.5N NaOH at 23° C. Within about 20 minutes, the pH typically decreases to about 8.3. By heating the samples to 40° C. and readjusting to a pH 9.6 with 2.5N NaOH a fairly rapid drop in sample pH occurs (e.g., to about pH 8.0 in about 12 minutes). With periodic addition of 2.5N NaOH, the pH is then maintained at about 9.9. When a constant pH 9.9 is achieved over a 30 minute period, deacetylation or saponification of the acetates to the hydroxyl form is complete. Decolorization and deionization of samples (adjusted to pH 6.3 with dilute HCl) are accomplished by passing the hydrolyzate samples through Duolite C-25 (H) resin column and then a Duolite A-6 (OH) resin column. This will essentially remove all the inorganic and organic salts. To stabilize the hydrolyzates, the ion exchanged effluents are then adjusted to pH 5.0 with dilute HCl.

TABLE 1

| | | Bacterial α-Amylase | | | | | |
|---|---|---|---|---|---|---|---|
| Starch % Acetyl | | 0 | | 3.05 | | 7.4 | |
| D.S. | | 0 | | 0.12 | | 0.30 | |
| | | α-Amylase Solubilized | α-Amylase Solubilized Plus α-Amylase | α-Amylase Solubilized | α-Amylase Solubilized Plus α-Amylase | α-Amylase Solubilized | α-Amylase Solubilized Plus α-Amylase |
| D.P. | 1 | 1.5 | 2.6 | 0.1 | 1.5 | 0 | 0.6 |
| | 2 | 4.3 | 8.1 | 1.8 | 5.0 | 0.1 | 3.0 |
| | 3 | 6.5 | 9.2 | 4.1 | 5.6 | 0.5 | 3.6 |
| | 4 | 3.3 | 4.3 | 2.5 | 3.1 | 0.3 | 2.2 |
| | 5 | 5.6 | 12.3 | 2.2 | 6.4 | 0.3 | 3.5 |
| | 6 | 19.4 | 19.8 | 8.6 | 15.9 | 1.3 | 11.0 |
| | 7 | 9.7 | 1.9 | 9.9 | 4.7 | 1.8 | 4.9 |
| | 8 | 0.9 | 1.9 | 4.1 | 1.9 | 1.2 | 1.1 |
| | 9 | 0.9 | 2.3 | 2.2 | 1.5 | 0.9 | 0.9 |
| | 10 | 1.2 | 2.7 | 1.6 | 1.7 | 0.6 | 0.9 |
| | 11–30 | 14.9 | 20.0 | 11.0 | 14.2 | 4.5 | 8.3 |
| | >30 | 31.8 | 15.0 | 52.0 | 38.8 | 88.7 | 68.1 |

TABLE 2

| Glucoamylase and β-Amylase % Acetyl D.S. | 0 0 | | | 3.05 0.12 | | | 7.4 0.30 | | |
|---|---|---|---|---|---|---|---|---|---|
| Saccharide D.P. | α-Amylase Solubilized | α-Amylase Solubilized Plus β-Amylase | α-Amylase Solubilized Plus Glucoamylase | α-Amylase Solubilized | α-Amylase Solubilized Plus β-Amylase | α-Amylase Solubilized Plus Glucoamylase | α-Amylase Solubilized | α-Amylase Solubilized Plus β-Amylase | α-Amylase Solubilized Plus Glucoamylase |
| 1 | 1.5 | <0.1 | 86.9 | 0.1 | 0 | 65.5 | 0 | 0 | 43.5 |
| 2 | 4.3 | 55.0 | 2.3 | 1.8 | 41.6 | 1.4 | 0.1 | 26.0 | 2.5 |
| 3 | 6.5 | 5.9 | 0.7 | 4.1 | 2.7 | 2.8 | 0.5 | 1.7 | 3.0 |
| 4 | 3.3 | 0.2 | 0.6 | 2.5 | — | 2.8 | 0.3 | 0.1 | 3.8 |
| 5 | 5.6 | 0.4 | 0.6 | 2.2 | 0.2 | 1.8 | 0.3 | 0.2 | 1.9 |
| 6 | 19.4 | 1.2 | 0.8 | 8.6 | 1.1 | 1.6 | 1.3 | 0.5 | 1.6 |
| 7 | 9.7 | 1.4 | 0.7 | 9.9 | } 1.9 | 1.5 | 1.8 | } 1.0 | 1.3 |
| 8 | 0.9 | 2.6 | 0.4 | 4.1 | 0.8 | 1.2 | 1.2 | 0.3 | 1.2 |
| 9 | 0.9 | 2.6 | 0.3 | 2.2 | 0.7 | 0.9 | 0.9 | 0.4 | 0.9 |
| 10 | 1.2 | 1.2 | 0.3 | 1.6 | 9.3 | 0.9 | 0.6 | 7.1 | 0.9 |
| 11–30 | 14.9 | 15.6 | 4.6 | 11.1 | 41.6 | 8.4 | 4.5 | 62.7 | 8.7 |
| >30 | 31.8 | 14.1 | 1.8 | 52.0 | | 11.1 | 88.7 | | 30.7 |

EXAMPLE 2

This example illustrates that a pasted starch which is subsequently derivatized to an acetate starch in solution (e.g., Starch Chemistry & Technology, Vol. II, Whistler et al. © Academic Press, Inc.) is more resistant to hydrolysis than a granular acetate starch of a comparable D.S. Apparently more homogeneous distribution of the acetate moiety throughout the starch mass occurs in a starch solution derivatization process. For comparative purposes, a regular dent corn starch acetate in the granular form (per Example 1) was prepared. Samples of granular and solution derivatized starches were then hydrolyzed with α-amylase at 80° C. for 24 hours. The test results of this experiment are tabulated in Table 3.

TABLE 3

| Starch | | Suspension Derivatized | Solution Derivatized |
|---|---|---|---|
| Acetyl, % | | 1.1 | 0.9 |
| Degree of Substitution (D.S.) | | 0.04 | 0.036 |
| Hydrolyzate (D.E.) | | 31.5 | 17 |
| Saccharides, (% d.s.b.) | | | |
| D.P. | 1 | 5.5 | 0.9 |
| | 2 | 13.9 | 4.9 |
| | 3 | 14.5 | 5.9 |
| | 4 | 7.3 | 5.1 |
| | 5 | 17.9 | 5.3 |
| | 6 | 10.6 | 7.4 |
| | 7 | 1.1 | 5.7 |
| | 8 | 1.0 | 2.9 |
| | ≦9 | 28.2 | 61.9 |

EXAMPLE 3

This example illustrates that the saccharide distribution (by α-amylase hydrolysis) reaches a limit beyond which the degree of substitution does not affect the saccharide distribution markedly.

In this example, a 0.10 D.S. acetate starch and a 0.20 D.S. acetate starch were used. These two different starches were prepared by derivatization of a granular regular corn starch in suspension per the derivatization method of Example 1. Table 4 tabulates the hydrolysis conditions and saccharide distribution of the resultant hydrolyzates.

TABLE 4

| Starch Acetate, D.S. | | 0.1 | 0.2 |
|---|---|---|---|
| Enzyme, Units/Starch Gram | | 0.375 | 0.45 |
| Temp. of Hydrolysis, ° C. | | 55 | 60 |
| Time of Hydrolysis, Hr. | | 4 | 5 |
| Reducing Sugar (D.E.) | | 17.6 | 16.4 |
| Dextrose, % | | 1.5 | 1.6 |
| Saccharides,[3] % | | | |
| D.P. | 1 | 2.0 | 1.4 |
| | 2 | 6.4 | 5.2 |
| | 3 | 7.6 | 5.6 |
| | 4 | 4.5 | 3.5 |
| | 5 | 6.8 | 5.8 |
| | 6 | 13.0 | 13.2 |
| | 7 | 7.3 | 5.4 |
| | 8 | 2.2 | 1.9 |
| | 9 | 1.7 | 1.9 |
| | ≧10 | 48.5 | 58.9 |

[3]Analyses by liquid chromatography

EXAMPLE 4

This example illustrates the production of α-amylase hydrolyzed hydrolyzates which contain an atypical high percent (weight basis) of D.P. 10 or higher saccharides. The starting starch substrate was a 0.2 D.S. regular corn starch acetate derivatized in accordance with Example 1. The hydrolysis conditions are reported in Table 5. The soluble and insoluble starch fractions were obtained by saponification methodology of Example 1. During the saponification reaction, a finite, but visible amount of insoluble saccharides will precipitate therefrom. Crystals thereof were formed by concentrating, cooling and aging the saponified hydrolyzate. These insoluble crystals were partitioned from the soluble starch fraction by washing and centrifuging three times with water-methanol (50:50) and lastly with pure methanol. The saccharide distribution of the total hydrolyzate product and the respective insoluble fractions and soluble fractions are reported in Table 5 by liquid chromatography analysis.

TABLE 5

| | | | | | | |
|---|---|---|---|---|---|---|
| Enzyme, Units/gm. Starch | | 0.45 | | | 0.45 | |
| Temp. of Hydrolysis, ° C. | | 60 | | | 60 | |
| Time of Hydrolysis, Hr. | | 1 | | | 5 | |
| Fraction | | Total Product | (87%) Soluble | (13%) Insoluble | Total Product | (85%) Soluble | (15%) Insoluble |
| Reducing Sugars (D.E.) | | 11 | 13 | | 16.4 | 17.8 | |
| Dextrose, % | | 1.0 | 1.1 | | 1.6 | 1.7 | |
| Saccharides, | | | | | | | |
| D.P. | 1 | 0.2 | 0.2 | | 1.4 | 1.5 | 1.3 |
| | 2 | 2.4 | 2.8 | | 5.2 | 6.2 | 1.0 |
| | 3 | 4.2 | 4.9 | | 5.6 | 6.5 | 0.8 |
| | 4 | 3.1 | 3.6 | | 3.5 | 4.3 | 0.8 |
| | 5 | 3.2 | 3.7 | | 5.8 | 6.7 | 1.3 |
| | 6 | 8.6 | 9.7 | 1.8 | 13.2 | 14.4 | 2.5 |
| | 7 | 8.5 | 9.5 | 2.0 | 5.4 | 6.0 | 2.0 |
| | 8 | 3.9 | 4.2 | 1.6 | 1.9 | 1.8 | 1.5 |
| | 9 | 2.1 | 2.2 | 1.8 | 1.9 | 1.7 | 2.2 |
| | ≦10 | 63.6 | 59.3 | 92.8 | 58.9 | 50.9 | 86.6 |
| | 10-30 | 18.3 | 14.8 | 41.8 | | | |
| | >30 | 45.3 | 44.5 | 51.0 | | | |

EXAMPLE 5

A low D.E. maltodextrin (D.E. 12.5) prepared from regular dent corn starch (which did not maintain a clear solution at a 1:1 maltodextrin to water weight ratio upon standing) was acetylated in solution to the following levels of substitution: 0.028 D.S. (0.7% acetyl) and 0.056 D.S. (1.45% acetyl).

The unmodified maltodextrin and the two acetylated maltodextrins (at 35-37% dry solids level) were hydrolyzed at 60° C. with 0.025% (0.065 units/gm.) and 0.005% (0.0125 units/gm.) levels of Ban 120 α-amylase (on maltodextrin d.s.b.) for the time intervals as indicated in Table 6 after which the hydrolyzates were heated at 95°-100° C. for 15 minutes to destroy the enzyme. The resultant products were deacetylated by saponification, deionized (ion-exchange) and freeze-dried.

The saccharide distribution of the α-amylase hydrolyzed maltodextrin acetates is substantially different (especially for the saccharides of D.P.>30 and, in some instances, D.P. 11≈30) from that obtained from the hydrolysis of unmodified maltodextrin. The saccharides of D.P.>30 for maltodextrin acetates are apparently cleaved into lower molecular weight fragments without substantially altering its D.P.>30 content.

As shown by the Table 6, further hydrolysis of the unmodified maltodextrin with α-amylase resulted in an appreciable increase in D.E. and a significant increase in fermentable sugar (i.e., F.E.) especially the D.P.$_{2-3}$ saccharides. In contrast, hydrolysis of the acetylated maltodextrin with α-amylase did not substantially alter either its D.E. or F.E. As indicated in Table 6, hydrolysis of the 12.5 D.E. unmodified maltodextrin generally resulted in a substantial reduction in saccharides of a D.P. greater than 30 and an increase in lower D.P. saccharides. In contrast, the acetylated maltodextrin hydrolyzate products at varying time intervals of hydrolysis retained essentially a constant D.P. 30+ content. When these hydrolyzed acetylated maltodextrins were saponified, the resultant maltodextrin products were soluble in water and did not separate or settle therefrom at 50% solids level as did the unmodified maltodextrin product indicating the insoluble D.P. 30+ saccharides had been hydrolyzed to a water-soluble D.P. 30+ form without appreciable alteration of their F.E. values.

lyzing amylase selected from the group consisting of alpha-amylase, beta-amylase and glucoamylase.

4. The method according to claim 3 wherein the hydrolyzed starch ester is saponified to a saccharide product essentially free from ester groups with a water-soluble, strong metal base at a pH between about 9.0 to about 12.0.

5. The method according to claim 4 wherein the starch ester consists essentially of a starch acetate.

6. The method according to claim 1 wherein the starch ester is hydrolyzed to a starch ester hydrolyzate with at least one 1,4-alpha-glucosidic hydrolyzing amylase.

7. The method according to claim 6 wherein the starch ester is saponified with a water-soluble, strong metal base at a pH between about 9.0 to about 12.0.

8. The method according to claim 7 wherein the saponified starch hydrolyzate product is neutralized to a pH of about 4.5 to about 6.0.

9. The method according to claim 7 wherein the degree of substitution for the starch ester ranges from about 0.1 to about 0.3 and the starch ester is hydrolyzed with beta-amylase to a starch hydrolyzate which contains on a total saccharide weight basis at least 80% saccharides of a D.P. 2.0 and D.P. greater than 30 and the weight percent of saccharides having a D.P. greater than 30 is at least equal to or greater than the weight percent of saccharides having a D.P. 2.0.

10. The saponified saccharide product according to claim 9.

TABLE 6

| Identification | Unmodified Maltodextrin | | Acetylated Maltodextrin | | | | Acetylated Maltodextrin | | | | Unmodified Maltodextrin | | | | |
|---|---|---|---|---|---|---|---|---|---|---|---|---|---|---|---|
| % Acetyl | 0 | | 0.7 | | 1.45 | | 1.45 | | | | 0 | | | | |
| D.S. | 0 | | 0.028 | | 0.056 | | 0.056 | | | | 0 | | | | |
| Enzyme Conc. % | 0 | 0.025 | 0.025 | | 0.025 | | 0.005 | | | | 0 | 0.005 | | | |
| Time, Min. | 0.5 | 47 | 47 | 77 | 47 | 77 | 17 | 47 | 77 | 107 | 0 | 17 | 47 | 77 | 107 |
| D.E. | 12.5 | 18.5 | 19.6 | 19.7 | 19.3 | 19.3 | 13.7 | 13.4 | 13.6 | — | 12.5 | 13.9 | 13.8 | 14.4 | — |
| Dextrose, % | 0.3 | 0.4 | 0.7 | 0.7 | 0.5 | 0.5 | 1.1 | 0.9 | 0.9 | — | 0.3 | 0.9 | 0.9 | (1.0) (0.6) | — |
| Saccharides, % | | | | | | | | | | | | | | | |
| D.P. 1 | 0.8 | 0.8 | 0.7 | 0.9 | 0.9 | 0.9 | 0.8 | 0.4 | 0.6 | 1.0 | 0.8 | 1.6 | 0.8 | 1.0 | 0.7 |
| 2 | 3.0 | 5.3 | 4.0 | 4.7 | 4.6 | 4.0 | 3.1 | 2.4 | 3.1 | 3.0 | 3.0 | 3.7 | 3.8 | 3.8 | 3.5 |
| 3 | 4.5 | 9.2 | 7.6 | 8.2 | 7.7 | 7.8 | 4.7 | 5.0 | 4.9 | 5.2 | 4.5 | 5.9 | 6.5 | 6.7 | 6.3 |
| 4 | 3.8 | 6.8 | 6.4 | 6.5 | 6.5 | 6.5 | 4.2 | 4.1 | 3.7 | 4.5 | 3.8 | 5.3 | 4.8 | 5.0 | 3.6 |
| 5 | 3.5 | 7.2 | 6.5 | 6.2 | 5.8 | 6.0 | 3.8 | 3.8 | 3.5 | 3.8 | 3.5 | 4.8 | 4.3 | 5.0 | 3.6 |
| 6 | 5.8 | 16.4 | 14.2 | 13.7 | 13.5 | 13.5 | 6.0 | 7.0 | 6.7 | 7.3 | 5.8 | 8.2 | 8.6 | 10.8 | 8.5 |
| 7 | 7.2 | 13.4 | 13.5 | 13.0 | 13.8 | 13.1 | 7.5 | 8.1 | 7.8 | 8.9 | 7.2 | 9.1 | 9.7 | 11.1 | 9.8 |
| 8 | 4.5 | 3.1 | 3.8 | 3.7 | 4.1 | 4.3 | 4.7 | 4.8 | 4.7 | 4.6 | 4.5 | 4.8 | 4.8 | 4.8 | 4.9 |
| 9 | 3.1 | 1.0 | 1.2 | 1.1 | 1.4 | 1.4 | 3.3 | 3.0 | 2.7 | 3.4 | 3.1 | 2.4 | 2.8 | 2.4 | 2.8 |
| 10 | 2.6 | 0.9 | 0.7 | 0.8 | 0.7 | 0.9 | 2.9 | 2.7 | 2.7 | 2.8 | 2.6 | 2.4 | 2.5 | 2.1 | 2.3 |
| 11–30 | 21.0 | 12.7 | 11.9 | 11.5 | 12.0 | 12.1 | 20.2 | 18.0 | 19.1 | 16.6 | 21.0 | 16.1 | 15.0 | 15.8 | 14.0 |
| 30+ | 40.3 | 23.4 | 29.5 | 29.7 | 29.1 | 29.6 | 39.0 | 40.7 | 40.6 | 39.2 | 40.3 | 35.2 | 36.6 | 31.5 | 38.6 |

What is claimed is:

1. A method for controlling the saccharide distribution for starch hydrolyzate obtained by the hydrolysis of starch ester with amylase, comprising:
   a. hydrolyzing a starch ester having a degree of ester substitution from about 0.05 to about 0.5 with an amylase to a starch ester hydrolyzate,
   b. saponifying the starch ester groups of the starch ester hydrolyzate to the hydroxyl form and thereby provide a saccharide product essentially free from ester groups, and
   c. recovering the saponfied saccharide product therefrom.

2. The method according to claim 1 wherein the degree of substitution of the starch ester ranges from about 0.1 to about 0.3.

3. The method according to claim 2 wherein the amylase comprises at least one 1,4-alpha-glucosidic hydro- 11. The method according to claim 7 wherein the starch ester D.S. ranges from about 0.1 to 0.3 and the starch ester is hydrolyzed with glucoamylase to a starch ester hydrolyzate having at least 40% by weight dextrose and at least 25% by weight saccharides of a D.P. greater than 30 with the saccharides which have a D.P. greater than 30 comprising the principal saccharides of a D.P. 2.0 and higher.

12. The saponified saccharide product according to claim 11.

13. The method according to claim 7 wherein the starch ester D.S. ranges from about 0.1 to about 0.3 and the starch hydrolyzate is hydrolyzed with alpha amylase to a starch ester hydrolyzate containing less than about 2.0% by weight saccharides of a D.P. 1 and 2, less than 15% by weight saccharides of a D.P. 11–30 and at least a major weight portion of the ester hydrolyzates have a D.P. greater than 30.0.

14. The saponified saccharide product according to claim 13.

* * * * *